UNITED STATES PATENT OFFICE.

MAX GRÜNBAUM, OF BERNE, SWITZERLAND, ASSIGNOR TO THE FIRM OF SOCIETY OF CHEMICAL INDUSTRY IN BASLE, OF BASEL, SWITZERLAND.

PRINTING SULFURIZED DYESTUFFS.

No. 901,705.     Specification of Letters Patent.     Patented Oct. 20, 1908.

Application filed December 2, 1907. Serial No. 404,645.

*To all whom it may concern:*

Be it known that I, MAX GRÜNBAUM, chemist, a subject of the Emperor of Russia, and resident of Berne, Switzerland, have invented new and useful Improvements in Printing Sulfurized Dyestuffs, of which the following is a full, clear, and exact specification.

The general application of sulfurized dyestuffs in printing has hitherto been difficult owing to the fact that it has been impossible to avoid the blackening of the brass or copper printing rollers by the sulfurized dyestuffs. Frequent propositions have been made for obviating this blackening, but without satisfactory result and with the added difficulty due to the necessity involved by all of them for using dyestuffs specially purified, that is to say devoid of free sulfur and alkali sulfid.

The present invention, by which blackening of the brass or copper rollers is prevented in a highly simple manner and which allows the use of dyestuffs containing sulfur or alkali sulfid, is based on the new and surprising observation that concentrated solutions of crystallized sodium sulfid, as well as solutions of sodium sulfid strongly alkaline with caustic alkali do not blacken copper or brass. For instance, a copper plate remains bright for a long time in a solution of 50 parts of crystallized sodium sulfid in 50 parts of water, or in a solution consisting of 60 grams of crystallized sodium sulfid, 80 c. c. of caustic soda lye of 40° Baumé specific gravity and 1 liter of water. The practical result of this observation is that printing colors which will not blacken brass or copper rollers can easily be made from sulfurized dyestuffs by adding to the printing paste a concentrated sodium sulfid solution with or without a strong caustic alkaline thickening and, so far as dyestuffs containing polysulfids are concerned, mixing the hot printing color with sodium hydrosulfite in order to destroy the said polysulfids.

The invention is illustrated by the following examples:

Example I. 10 parts of pyrogencyanin L, 80 parts of crystallized sodium sulfid, 80 parts of water, 30 parts of British gum, are boiled together for ¼ hour; after cooling, the paste is printed, brass rollers being used, the printed goods are dried, then steamed for 2–3 minutes in the Mather-Platt apparatus, rinsed and soaped.

Example II. 50 grams of pyrogen yellow OR are heated to boiling with 200 grams of sodium sulfid solution (1 part of crystallized sodium sulfid and 1 part of water) and 700 grams of alkaline thickening (consisting of 200 grams of British gum, 700 grams of caustic soda lye of 40° Baumé specific gravity and 100 grams of kaolin), ¼ hour, while stirring; 50 grams of sodium hydrosulfite of 80–85 per cent., strength are then added, the heating continued for 5 minutes and the whole cooled. This paste can be printed with brass or copper rollers, which are not blackened by it. It is to be observed, however that at the end of the printing, before the rollers are washed, the latter must be completely covered with the color. It is also necessary, especially when using copper rollers, before washing them with pure water, to wash them first with dilute caustic soda lye or with a strong caustic alkali solution of sodium sulfid. The printed goods are well dried and then rinsed and soaped either directly after drying, or after treatment in the Mather-Platt apparatus for 2–3 minutes at 100°–102° C.

Example III. 100 grams of pyrogen black G, 400 grams of sodium sulfid solution (1:1), 420 grams of alkaline thickening of the composition given in Example II, are boiled together ¼ hour, 80 grams of hydrosulfite are added, the heating is continued for 5 minutes and the whole is cooled. Printing and finishing are as before, but it may be noted that in printing black sulfurized dyestuffs brass rollers are best.

Example IV. 50 grams of pyrogen dark green B, 200 grams of sodium sulfid solution (1:1), 700 grams of alkaline thickening, are boiled for ¼ hour, 50 grams of hydrosulfite are added, heating is continued for 5 minutes and the mass is cooled and printed. The printed goods are well dried and directly washed and soaped without previous steaming. In analogous manner printing colors may be prepared from other sulfurized dyestuffs, of whatever shade and composition, for instance, from pyrogen green, pyrogen blue, pyrogen brown, thiophenol black, as well as from the sulfurized dyestuffs known under the names immedial, katigen and thiogen dyestuffs.

What I claim is:

1. The herein described improved process for printing sulfurized dyestuffs, which consists in first preparing a printing color which contains an excess of sodium sulfid at such a high degree of concentration that brass or copper is not attacked thereby, and then printing the same by means of rollers containing copper, whereby such printing may be effected without blackening of said rollers.

2. The herein described improved process for printing sulfurized dyestuffs, which consists in first preparing a printing color which contains caustic alkali and an excess of sodium sulfid at such a high degree of concentration that brass or copper is not attacked thereby, and then printing the same by means of rollers containing copper, whereby such printing may be effected without blackening of said rollers.

3. The herein described improved process for printing sulfurized dyestuffs, which consists in first preparing a printing color which contains a caustic alkali and hydro-sulfite and an excess of sodium sulfid at such a high degree of concentration that brass or copper is not attacked thereby, and then printing the same by means of rollers containing copper, whereby such printing may be effected without blackening of said rollers.

In witness whereof I have hereunto signed my name this 16th day of November 1907, in the presence of two subscribing witnesses.

MAX GRÜNBAUM.

Witnesses:
  AMAND RITTER,
  AMAND BRAUN.